April 16, 1963   R. J. SCHLIEKELMANN   3,085,925
METHOD OF FORMING AN AIRCRAFT PART HAVING
A PLIABLE DEICER BOOT THEREON
Filed Feb. 19, 1958   3 Sheets-Sheet 2

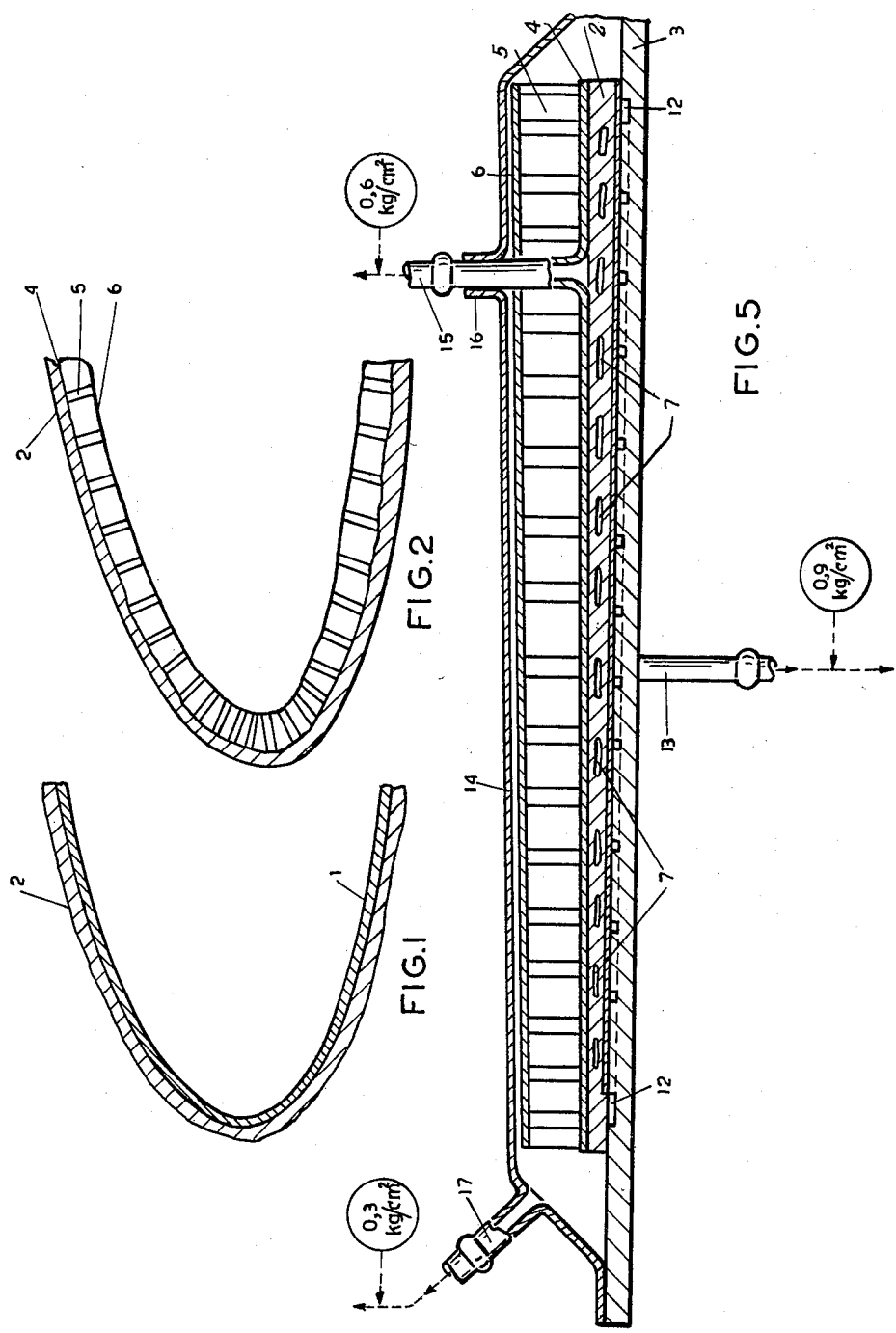

April 16, 1963 R. J. SCHLIEKELMANN 3,085,925
METHOD OF FORMING AN AIRCRAFT PART HAVING
A PLIABLE DEICER BOOT THEREON
Filed Feb. 19, 1958 3 Sheets-Sheet 3

3,085,925
METHOD OF FORMING AN AIRCRAFT PART HAVING A PLIABLE DEICER BOOT THEREON
Robert J. Schliekelmann, Nieuwer Amstel, Netherlands, assignor to N.V. Konenklijke Nederlandse Vliegtuigenfabriek Fokker, Amsterdam, Netherlands
Filed Feb. 19, 1958, Ser. No. 716,069
Claims priority, application Netherlands Feb. 20, 1957
2 Claims. (Cl. 156—285)

This invention relates to methods for the manufacture of a boot for an aircraft part such as the leading edge or nose of a wing, tail, fuselage or aileron. Such boots are in general provided for preventing ice formation and/or removing any ice that may have formed.

Heretofore such boots, and in particular those made of rubber, have been applied to the outer surface of an existing aircraft part. This method has different drawbacks. For example, boots prepared this way inevitably have unevennesses and differences in thickness corresponding to the places where connections are provided which manifest themselves on the outside of the boot by impairing the aerodynamic form thereof. Deficiencies of this kind also occur at the exterior of the boot in places where the boot has differences in thickness or transitions.

The invention is based on the principle that the above-noted drawback can be ascribed to the way in which boots have heretofore been applied to aircraft parts, namely by starting from an existing profile.

The method of manufacture according to the invention is characterized in that an aircraft part is constructed from the outside to the inside in a hollow mould, the inner surface of which corresponds exactly with the desired outer aircraft part profile. Against this inner surface, the outer side of the said boot is disposed, followed by the arrangement of the further elements of the aircraft part inside the mould. The result of this method is that the unevennesses and differences in thickness in the boot and those due to the connections of the boot are incorporated in the skin of the aircraft part itself, so that aerodynamic troubles are avoided and a faultless aerofoil profile is obtained.

With the method according to the invention, it is of the utmost importance that the outer side of the boot abuts exactly against the inner surface of the mould. According to the invention this is obtained by urging the said boot against the mould by the action, preferably by means of channels., bores or the like provided by way of recesses in the inner surface of the mould.

According to the invention it is preferred to construct the aircraft part from a number of layers interconnected by an adhesive such as a synthetic resin. Such synthetic resin may be hardened under the influence of mechanical pressure and/or raised temeprature. The pressure may be obtained by pneumatic or hydraulic means. A suitable manner of practicing the method of the invention is characterized in that the layers of the aircraft part that are to be glued together are pressed against each other. An impervious layer is disposed against the inner side of the part. In the space between this layer and the inner surface of the mould a second vacuum is maintained, the value of which is smaller than that prevailing in the said channels of the mould, i.e. the first vacuum.

The invention may be applied to boots according to the Dutch Patent 46,759, which are adapted for the supply of chemicals to the outer side of the aircraft part. The invention may also be applied to boots which contain wires or tapes which are to be heated by electricity. The invention may also be applied to boots, which are provided with interior, expandable channels. If the invention is to be applied to aircraft parts covered with a boot having expandable interior channels, it is preferable to apply a vacuum to these channels having a value between the values of the above-mentioned vacua, i.e. less than the value of the first vacuum applied to the mould channels and greater than the value of the vacuum applied under to impervious layer. In particular by applying these different vacua the boot will bear smoothly against the inner side of the mould and any unevenesses will only be on the inner surface of the boat. A further suitable method for practicing the invention consists of constructing the aircraft part by layering successively a sheet of rubber, a layer of synthetic resin containing glass fibres, a honeycomb core of stiff, light material such as aluminum, and a second layer of synthetic resin containing glass fibres in said mould. The use of such honeycomb cores is particularly efficient as such a core is convenient for absorbing the differences in thickness of the boot at the various connections and has nevertheless a suitable strength.

Any cavities which might exist and which cannot be filled by the core construction may be filled with thermoplastic glue or paste to insure that the boot is rigidly connected in entirety with the aircraft part.

An aircraft wing's leading edge or similar part made according to the method of the present invention is characterized in that said part, including the boot, forms an individual unit, which as such is adapted to be secured in a detachable manner to the supporting structure of the associated aircraft construction. This is an important advantage compared to known constructions, in which the boot was glued to an existing wing part. Thus, when it was necessary to renew the boot, the glue connection had to be detached, whereupon a new boot had to be glued onto the wing part. Such operations take much time and make it necessary to keep an aircraft on the ground during a relatively long time, which is uneconomical. With the construction according to the invention a whole aircraft part is simply and rapidly replaced by another.

The invention will now be further elucidated with reference to the drawing, in which:

FIGURE 1 shows schematically a sectional view of an aircraft wing's leading edge provided with a boot constructed in conventional manner;

FIGURE 2 shows schematically a sectional view of a wing leading edge provided with a boot constructed in accordance with the present method;

FIGURE 5 shows a sectional view of a mould and a corresponding aircraft part, drawn in developed position for illustrating the various vacua applied.

In FIGURE 1 the numeral 1 designates the usual leading edge onto which a rubber boot 2 is glued. The outer surface of the boot 2 shows unevennesses which impair the aerodynamic form.

Figure 3:
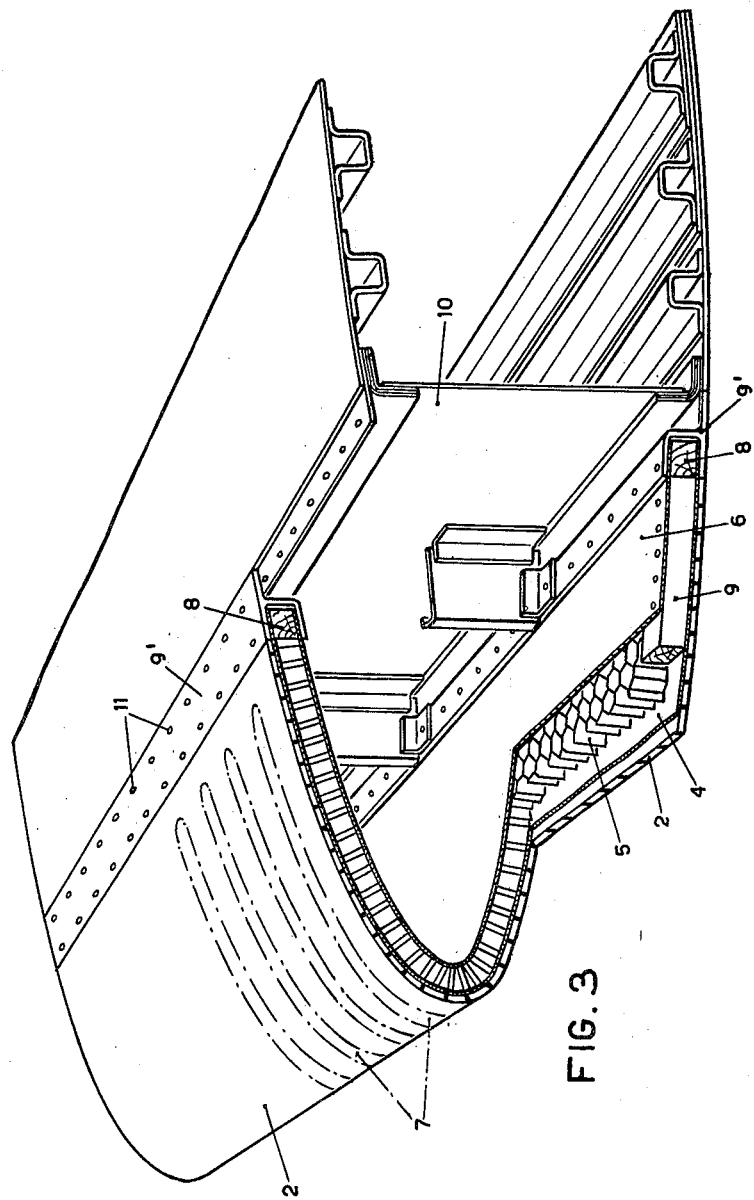
FIGURE 3 shows a perspective view, partly in section, of the leading edge according to FIGURE 2 with the supporting part of the aircraft wing.
Figure 4:
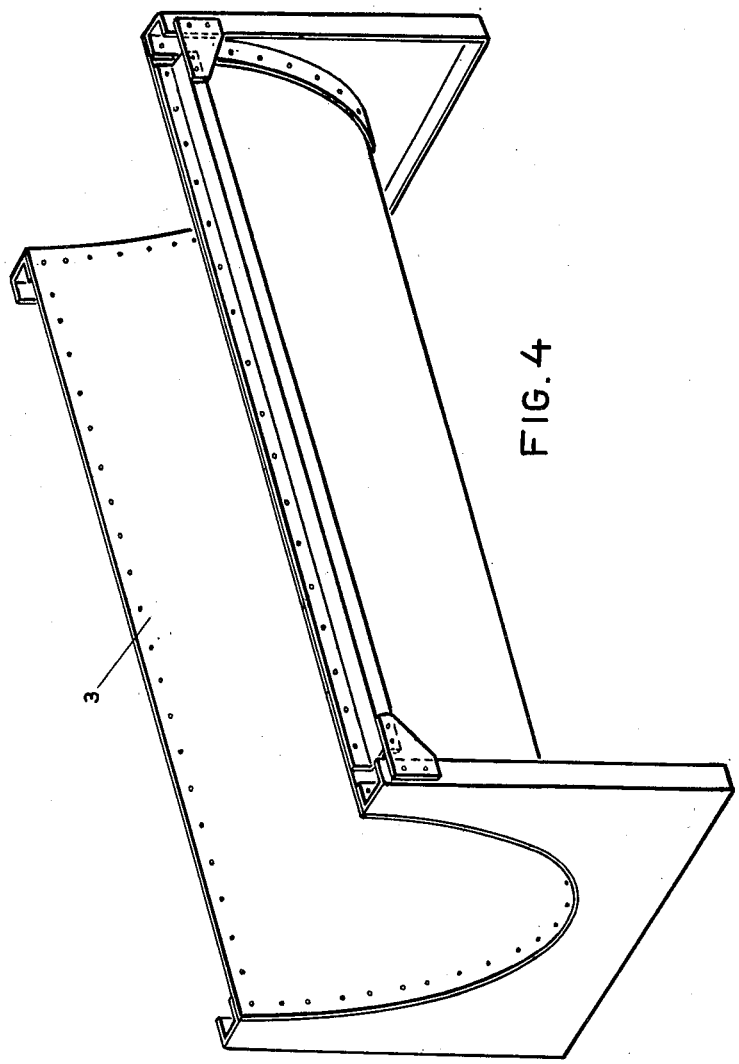
FIGURE 4 shows a perspective view of the mould or hollow form to be used in connection with the invention.

These troubling unevennesses are avoided in the wing construction according to FIGURE 2 by starting from a rubber boot 2, which is placed during the construction of the unit in the mould 3 of FIGURE 4 in a manner which will be described hereafter. Directly on the rubber boot 2, a layer 4 (FIG. 3) of synthetic resin containing glass fibres is applied and thereafter a honeycomb core 5 of aluminum foil, the inner side of which is sealed by a second layer 6 of synthetic resin containing glass fibres. FIGURE 3 shows at the same time the interior channels 7 of the rubber boot.

The longitudinal and transverse edges of the leading edge piece are provided with wooden fillets 8, 9, the fillets 8 being enclosed by J-profiles 9, which are connected with the wing and make a detachable connection with the main girder 10 possible. For this purpose connecting holes 11 are provided in the exteriorly disposed flange of each profile 9. FIGURE 3 indicates that the leading edge construction can be made so strong that stiffening partitions may be omitted.

According to the invention, the following working method is employed. The honeycomb core 5 is pickled, thoroughly rinsed and dried to provide good adhesion of the glue or synthetic resin. The core is thereupon provisionally bent in the mould 3 of FIGURE 4. Preferably the cores should be bent along a somewhat sharper curve that the curve of the finished part, which is done to obtain a better attachment to the boot in the further construction. The core is provided with suitable recesses for the connections of the boot (pneumatic, hydraulic or electric conduit pipes or cables).

The surface of the rubber boot 2 is suitably treated beforehand to permit the required adhesion to the synthetic resin glue, which is preferably Araldite 553 epoxy resin. A prior treatment of the rubber boot with concentrated sulfuric acid followed by a thorough rinsing with water and drying is very efficient. The boot thus prepared and cut to measure is placed into the mould 3 and is, under the influence of vacuum and by means of the connection 13 (FIG. 5) sucked against the inner surface of the mould. If necessary, a very thin pervious layer of glass tissue may be applied between the mould and the rubber boot. A suitable vacuum therefor is 12.6 lbs./sq. inch.

To prevent air leakage the circumference of the pervious layer must remain at a distance of about 3/8" within the circumference of the edge vacuum channel 12. Any perceptible differences in thickness occurring at the connections with the channels are smoothly finished off on the inner side of the coating by means of a paste of synthetic resin and with the aid of a putty knife. Then the glass fibre layer 4, impregnated with Araldite 553, is applied, while in the channels 7 of the boot 2 a vacuum of 8.4 lbs./sq. inch is maintained.

After the impregnation of the glass fibre layer 4 with Araldite 553, the matching honeycomb core 5 and the wooden edge fillets 8, 9 are applied, and between the core and the wooden edge fillets strips of glass fibres impregnated with synthetic resin may be applied. On a cellophane foil the glass fibre inner layer 6 is thereupon impregnated with Araldite 553 and this inner layer 6 is placed on the honeycomb core 5 with the cellophane foil on the inner side. Finally the whole is covered with a vacuum bag 14 which is suitably sealed along the edges of the mould 3 and the connection 17 of the bag is brought into communication with a vacuum of 4.2 lbs./sq. inch. The connection 15 of the boot is suitably passed through a portion 16 of the vacuum bag 14. It goes without saying that, while the vacuum bag is being applied, it is necessary to interrupt temporarily the vacuum in the channels 7 for the boot 2.

The hardening of the Araldite glue is then effected at an increased temperature of, for example, 80–100° C., whereafter the vacuum connections are detached and the wing leading edge can be removed from the mould. If necessary, for this purpose, use can be made of the de-icing channels 7 so as to facilitate the removal.

What I claim is:

1. A method of forming an aircraft part having a pliable deicer boot thereon, said boot being provided with internal expandable channels, said part having a predetermined aerodynamic profile, said method comprising: sucking said pliable boot against a form having a shape corresponding to said aerodynamic profile, said boot being sucked against said form with a vacuum of predetermined magnitude, applying a bonding layer to said boot, applying a structural member to said bonding layer, applying to the part a vacuum of magnitude less than that of the first said vacuum with said boot sucked against said part, said method further comprising maintaining in said channels a vacuum having a magnitude intermediate that of the first said vacuum.

2. A method as claimed in claim 1 further comprising applying a layer to said structural member to seal said member.

References Cited in the file of this patent

UNITED STATES PATENTS

| | | |
|---|---|---|
| 2,137,394 | Driscoll | Nov. 22, 1938 |
| 2,343,986 | Leutholt | Mar. 14, 1944 |
| 2,393,635 | Hubbard | Jan. 29, 1946 |
| 2,446,328 | Heston | Aug. 3, 1948 |
| 2,478,165 | Collins | Aug. 2, 1949 |
| 2,512,875 | Reynolds | June 27, 1950 |
| 2,563,218 | Darracott et al. | Aug. 7, 1951 |
| 2,723,092 | Paselk et al. | Nov. 8, 1955 |
| 2,805,974 | Brucker | Sept. 10, 1957 |
| 2,863,491 | Adams | Dec. 9, 1958 |

FOREIGN PATENTS

| | | |
|---|---|---|
| 6,611 | Netherlands | Feb. 15, 1922 |